July 17, 1951 A. V. WEASLER 2,561,160
WHEEL COVER MOUNTING
Filed Feb. 1, 1950
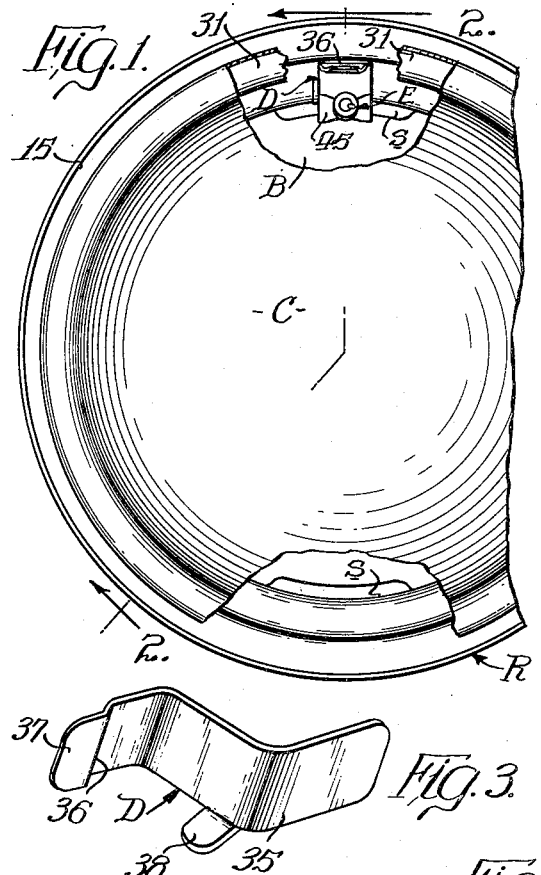
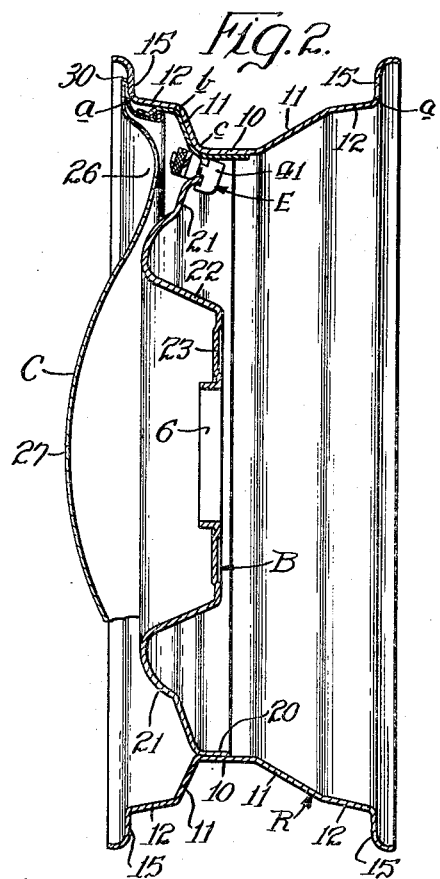
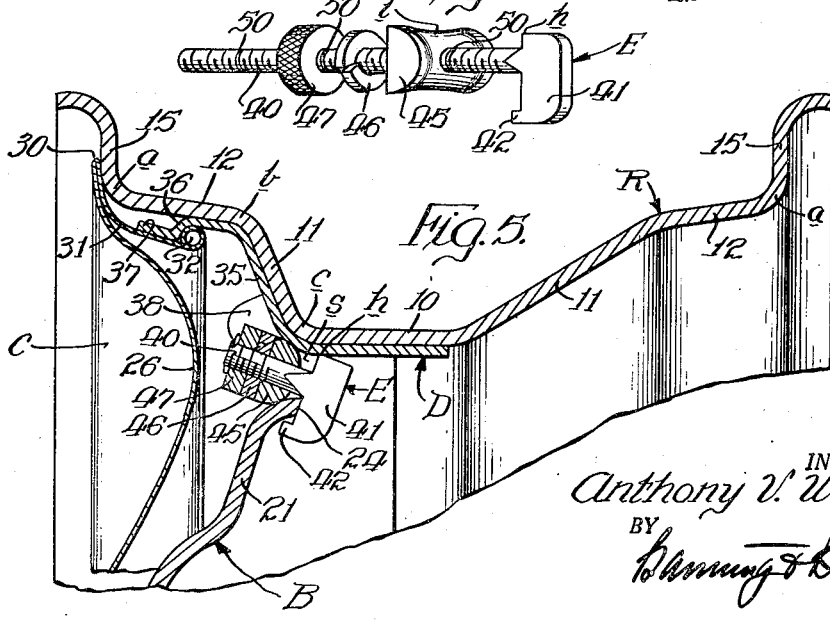
INVENTOR.
Anthony V. Weasler Patented July 17, 1951

2,561,160

UNITED STATES PATENT OFFICE 2,561,160

WHEEL COVER MOUNTING

Anthony V. Weasler, West Bend, Wis., assignor to Pick Manufacturing Company, West Bend, Wis., a corporation of Wisconsin Application February 1, 1950, Serial No. 141,665

7 Claims. (Cl. 301—37)

This invention relates to a simple and inexpensive mounting applicable to a vehicle wheel for supporting thereon a cover, ornamental or otherwise, in the nature of a circular disc. Such a cover may be highly attractive since it is usually finished in chromium or otherwise to present a pleasing contrast to the peripheral portion of the wheel which of necessity must remain exposed to view.

Covers of this kind have at present become very popular for use on automobiles. However, it is difficult to provide a fastening means that is applicable to many different kinds and sizes of wheels without modification or special design to meet the many different situations which are encountered. The present attaching means has a wide range of application, so much so as to be substantially universal in its use. The same is true of the cover which is secured in place thereby. At most it is necessary only that the cover be furnished in two, or perhaps three, different sizes, each to correspond with a wheel of generally corresponding size. The attaching means herein disclosed is susceptible of utilization without requiring any adaptation thereof, or of the cover, or of the wheel with which it is associated.

The present construction is one which is simple, inexpensive, and entirely adequate for the secure fastening of a cover upon the wheel of a vehicle. It may be readily applied in place by anyone with only the simplest tools, and when installed the cover will remain secured in place indefinitely. Should it be necessary or desirable to remove the cover at any time, this can be done with the aid of a proper tool and without demounting of the fastening means.

A suggestive embodiment of this invention is set forth in the accompanying drawing, wherein—

Figure 1 is a view in elevation of the outer side of a conventional vehicle wheel to which is applied a cover that is secured in place by the invisible attaching means elsewhere herein illustrated in detail, the cover being broken away at two points to show (a) one of the attaching means in operative position, and (b) an unoccupied wheel slot as it appears before installation of an attaching means thereat;

Fig. 2 is a transverse section taken on line 2—2 of Fig. 1;

Figs. 3 and 4 are perspective views, respectively, of the clamp and bolt assembly comprised in the attaching means; and Fig. 5 is an enlarged fragmentary section through a peripheral portion of the wheel where one of the fastening means is applied, showing the cover secured in place thereby.

The vehicle wheel may be conventional in that it combines a drop center type rim R and a disc body B having a center opening 6 coaxial with the hub (not shown). In the contour of the rim is comprised a center base flange 10 between intermediate side flanges 11 which extend divergingly outwardly to join with intermediate base flanges 12. Along the opposite edges of each intermediate base flange 12 is formed a radially extending wall 15 having a curved outer edge. At the juncture of each side wall 15 with its supporting base flange 12 is a bead $a$, and a second bead $b$ is formed at the point of juncture of the forward base flange 12 with its supporting side flange 11. There is also a third bead $c$ formed toward the forward end of the wheel at the juncture of the proximate intermediate side flange 11 with the center base flange 10. A rim having this general contour is adapted to receive and hold a resilient tire (not shown) in a well-known manner.

The disc body B is formed with an outer flange 20 which extends rearwardly to engage the drop center of the rim for secure connection therewith, as by welding. This disc body may be variously countered cross-sectionally, the one illustrated including a rearwardly inclined outer web portion 21 which is proximate to the outer flange 20. An inner web portion 22 constituting part of the disc body joins with a wheel mounting flange 23 wherein is the center opening 6 already noted. At spaced points circumferentially of the disc the outer flange 20 is inset to provide a plurality of ventilating slots $s$, each adjacent the rearwardly extending outer flange 20. These openings, perhaps four in number, are customarily arcuate; they may be about 2½" in length; and they are rather narrow. The inner edge of each such slot is rearwardly curved to provide a lip 24 of which advantage is taken as will presently appear.

The attaching means of this invention makes effective use of the ventilating slots so provided, to secure to the wheel the disc-like cover C which in ordinary use of the vehicle will remain in place undisturbed for many months or even years. As best shown in Figs. 1 and 2, this cover has a circular periphery, and in transverse cross-section is curved rearwardly at 26 in an outer portion and then forwardly again at 27 in its central portion to provide a smooth convex contour of bowl effect. At its periphery the cover is reversely bent at 30 to provide a somewhat resilient flange 31 which extends inwardly and then rearwardly to occupy a position to the inside of the outer intermediate base flange 12 of the rim. The cover flange 31 terminates in a bead 32 which for present purposes is desirably formed entirely to one side of the flange, i. e., radially outwardly thereof.

The attaching means comprises two components, one a clamp D and the other a bolt assembly E. The clamp is in the general form of a strap 35 having a longitudinal contour corresponding generally to the cross-sectional contour of the center base flange 10, the intermediate side flange 11 which lies toward the wheel front, and the intermediate base flange 12 that is proximate thereto. Near the forward end of the clamp is a transverse offset to provide a depending shoulder 36 beyond which the clamp terminates in a tongue 37. This tongue is adapted to engage the cover flange 31 and when so positioned the shoulder 36 lies rearwardly of the bead 32, assuming that the cover is then fitted properly in place. To reach this operative position, the cover flange 31 is required to flex inwardly to the point of permitting its bead 32 to slide over the tongue 37 and into engagement with the clamp shoulder 36, as shown best in Fig. 5. An ear 38 also depends from one side of the clamp at a point nearly opposite the bead c for a purpose that will presently appear.

The clamp when fitted in place is positioned with its rearward end portion against the center base flange 10. If the clamp be held firmly against the wheel rim, as shown, it will be incapable of shifting transversely thereof rearwardly of the wheel. By the bolt assembly now to be described, the clamp is so secured, and with pressures applied convergingly to spaced points in a manner which is effective to prevent endwise shifting of the clamp in an opposite direction, i. e., toward the front of the wheel.

In the bolt assembly E is comprised a threaded shank 40 which initially may be over-long in length (see Fig. 4). This shank is joined to a flattened head 41 toward one end thereof, the opposite end of the head being provided with a lug 42 which extends parallel with the shank. When the bolt is operatively positioned, this lug will engage the lip 24 along the inner edge of one of the slots s in the wheel disc, thereby locking the bolt against rotative movement. At its opposite end the inner corner h of the bolt head 41 provides a chin that is adapted to engage the clamp at a point opposite the center base flange 10 of the wheel rim. The distance to which the lip 24 is extended rearwardly determines how close to the bead c will be the point of engagement of the chin h with the clamp. The bolt shank which at its juncture with the head 41 may be rested on the lip 24 is extended outwardly and divergingly with respect to the axis of the wheel so that any end pull on the bolt will be effectively resisted by engagement of the bolt head with the rearward face of the wheel body B and with the clamp.

Fitted loosely upon the bolt is an elongated thrust block 45 which in cross sectional contour is convex upon its face l which confronts the bolt head. Lengthwise of itself this block may also be slightly concave so that the width of the block is slightly narrower in its center region. Included in the bolt assembly is a spring washer 46 and a nut 47 which may be knurled or otherwise formed on its peripheral surface. When the nut is rotatively advanced upon the bolt to apply pressure to the spring washer, the bolt is reactively drawn forwardly so that its head 41 is engaged tightly with the disc lip 24 and also with the clamp at a point opposite thereto, assuming that the latter has been positioned operatively in place as already described. In this advance of the nut the block 45 is subjected to a thrust which is transmitted therethrough to the clamp and the disc lip 24, the space therebetween being somewhat narrower than the width of the block transversely of the bolt. In this way the clamp is subjected to pressure at spaced points at opposite sides of the constriction provided by the narrow slot s through which the clamp is extended. The clamp is accordingly secured firmly against movement longitudinally of itself in either direction.

When a plurality of such attaching devices has been secured to the wheel body adjacent its periphery, each of the associated clamps will be held fixedly against movement. These clamps then provide collectively a mounting upon which the cover may be snap-fitted by forcing its bead 32 on the resilient flange 31 along the clamp tongue 37 and past the shoulder 36, as best shown in Fig. 3. The cover will then be caught and fixedly held by the several clamps. If and when it is necessary or desirable to remove the cover, resort is then had to an appropriate tool whereby the cover is forced off its collective mounting by an axial movement, the bead 32 being disengaged in the process from the offset shoulders of the several clamps. It will be noted that this offset is not characterized by sharp angles, but rather by easy curves with the shoulder extended slightly obliquely. This not only is much easier to produce in metal, but also facilitates the movement of the bead on and off the shoulder when the cover is being applied or removed.

Initially the bolt shank 40 may be provided with a length in excess of that required for many installations. When the mountings are applied in place, the excess lengths of these bolts can then be removed. This can be done with a cutting tool or with a plier by flexing the bolt back and forth to break it off; if the bolt be formed with breaking grooves 50 (see Fig. 4) it can be bent and ruptured with even greater facility. If desired, the exposed end of the shank may then be peened to prevent the nut 47 from working off. In this way each bolt can readily be trimmed to the length required for the particular installation where it is to be used.

In applying each bolt assembly, the head 41 is turned to a rotative position in alignment with the length of the narrow slot s through which it is to be inserted; when passed therethrough, the bolt is turned 90° to present its lug 42 inwardly of the lip 24 for engagement therewith. In doing this, the chin h of the bolt head is also brought into engagement with the clamp at a point rearwardly of the constriction provided by the ventilating slot s. With the parts thus positioned, forward axial movement of the bolt, in response to rotative advance of the nut, will subject the clamp to pressures applied convergingly at spaced points oppositely of the curved bead c. As a result, the clamp is secured firmly to provide one of the several mountings whereon the cover C is adapted to be snap-fitted for fixed attachment to the wheel.

Each thrust block 45, when operatively positioned, stands in front of a ventilating slot s whose radial dimension is so small as to bar passage of the block therethrough. Because the slot is elongated arcuately it does not provide an opening against whose periphery the convex face of the block can be accurately fitted unless the block contour be concave endwise or otherwise formed. By having the block formed with maximum cross sectional dimensions at two spaced points, i. e., at or near its opposite ends, I provide two points of bearing, outwardly and beyond the bearing point of the bolt head, which will assure fitting of the thrust block in place accurately and immovably. In assembling the clamp and bolt assembly when the attaching means is applied to a wheel, it may be found expedient first to insert the bolt so that its head is hooked behind the lip 24, then to follow with insertion of the clamp, and finally to advance the nut rotatively to secure these parts fixedly in their operative positions. In doing this, the clamp ear 38 will prevent a too-far insertion of the clamp within the slot. Normally it stands opposite one end of the thrust block so that, if one be moved laterally into engagement with the other, the bolt is then centered with respect to the clamp.

I claim:

1. In combination with a vehicle disc wheel wherein is a plurality of elongated ventilating slots adjacent the wheel rim and a cover therefor having a rearwardly extended beaded flange, a mounting comprising a shouldered clamp in the general form of a strap inserted through each slot to a position where the flange bead is in engagement with the clamp shoulder, and a bolt assembly also extended through each slot alongside the clamp, the assembly including a bolt having a head in engagement with the clamp and with the rear face of the disc adjacent the inner edge of the slot, and a thrust block in engagement with the clamp at a second point thereon and with the front face of the disc.

2. In combination with a vehicle disc wheel wherein is a plurality of elongated ventilating slots adjacent the wheel rim and a cover therefor having a rearwardly extended beaded flange, a mounting comprising a shouldered clamp in the general form of a strap inserted through each slot to a position where the flange bead is in engagement with the clamp shoulder, and a bolt assembly also extended through each slot alongside the clamp, the assembly including a bolt having a head in engagement with the clamp and with the rear face of the disc adjacent the inner edge of the slot, and a thrust block in engagement with the clamp at a second point thereon and with the front face of the disc, the thrust block being formed with means to confine its engagement with the front face of the disc to two spaced points outwardly and beyond the point of the bolt head engagement therewith.

3. In combination with a vehicle disc wheel wherein is a plurality of elongated ventilating slots adjacent the wheel rim and a cover therefor having a rearwardly extended beaded flange, a mounting comprising a shouldered clamp in the general form of a strap inserted through each slot to a position where the flange bead is in engagement with the clamp shoulder, and a bolt assembly also extended through each slot alongside the clamp, the assembly including a bolt having a head in engagement with the clamp and with the rear face of the disc adjacent the inner edge of the slot, and a thrust block in engagement with the clamp at a second point thereon and with the front face of the disc, and means extended from the clamp for engagement with the bolt assembly to prevent shifting of the former with respect to the latter in one direction.

4. In combination with a vehicle disc wheel wherein is a plurality of elongated ventilated slots adjacent the wheel rim and a cover therefor having a rearwardly extended beaded flange, a mounting comprising a shouldered clamp in the general form of a strap inserted through each slot to a position where the flange bead is in engagement with the clamp shoulder, and a bolt assembly also extended through each slot alongside the clamp, the assembly including a flattened elongated head on the bolt, the width of the head being less than the narrow dimension of the slot and the head length being greater than the narrow dimension of the slot whereby the head, when turned to a position where its length is transverse to the width of the slot, will engage with the clamp and with the rear face of the disc to prevent axial forward movement of the bolt, and a thrust block in engagement with the clamp at a second point thereon and with the front face of the disc.

5. In combination with a vehicle disc wheel having adjacent its rim a plurality of concentric arcuate ventilating slots each formed with a rearwardly turned inner edge and a cover therefor having a rearwardly extending beaded flange, a mounting comprising a shouldered clamp in the general form of a strap inserted through each slot to a position where the flange bead is in engagement with the clamp shoulder, and a bolt assembly also extended through each slot alongside the clamp, the assembly including a bolt having a head formed with a chin and opposite thereto a forwardly extending lug, the chin being engageable with the clamp and the lug with the rearwardly turned inner edge of the slot, and a thrust block in engagement with the clamp at a second point thereon and with the forward face of the disc.

6. In combination with a vehicle disc wheel having adjacent its rim a plurality of concentric arcuate ventilating slots each formed with a rearwardly turned inner edge and a cover therefor having a rearwardly extending beaded flange, a mounting comprising a clamp in the general form of a strap arranged for insertion through each slot, the clamp being contoured endwise in conformity with the transverse contour of the rim and near its forward end being provided with an offset shoulder for engagement with the flange bead extended rearwardly from the cover, and a bolt assembly also extended through each slot alongside the clamp, the assembly including a bolt having an elongated head which, when in one rotative position, is free to pass through the slot and, when in another rotative position, is engageable with the clamp at one point and with the rear face of the disc so as to be prevented from axial movement in a forward direction, a block freely carried on the bolt shank for engagement with the clamp at a second point thereon and with the forward face of the disc, and a nut in screw threaded engagement with the bolt shank and adapted when advanced rotatively thereupon to press and hold the block tightly against the disc and the clamp at a forward point and reactively press and hold the bolt head tightly against the disc and the clamp at a rearward point, thereby to secure the clamp fixedly in place.

7. In combination with a vehicle disc wheel having adjacent its rim a plurality of concentric arcuate ventilating slots each formed with a rearwardly turned inner edge and a cover therefor having a rearwardly extending beaded flange, a mounting comprising a clamp in the general form of a strap arranged for insertion through each slot, the clamp being contoured endwise in conformity with the transverse contour of the rim and near its forward end being provided with an offset shoulder for engagement with the flange bead extended rearwardly from the cover, and a bolt assembly also extended through each slot alongside the clamp, the assembly including a bolt having an elongated head which, when in one rotative position, is free to pass through the slot and, when in another rotative position, is engageable with the clamp at one point and with the rear face of the discs so as to be prevented from axial movement in a forward direction, means on the bolt head engaging the rearwardly turned inner edge of the slot to prevent rotation of the bolt, a block freely carried on the bolt shank for engagement with the clamp at a second point thereon and with the forward face of the disc, and a nut in screw threaded engagement with the bolt shank and adapted when advanced rotatively thereupon to press and hold the block tightly against the disc and the clamp at a forward point and reactively press and hold the bolt head tightly against the disc and the clamp at a rearward point, thereby to secure the clamp fixedly in place.

ANTHONY V. WEASLER.

REFERENCES CITED

The following references are of record in the file of this patent:

UNITED STATES PATENTS

| Number | Name | Date |
| --- | --- | --- |
| 2,106,586 | Zerk | Jan. 25, 1938 |
| 2,386,231 | Lyon | Oct. 9, 1945 |

FOREIGN PATENTS

| Number | Country | Date |
| --- | --- | --- |
| 462,025 | Great Britain | Feb. 26, 1937 |